United States Patent [19]

Arrigoni

[11] 4,285,108
[45] Aug. 25, 1981

[54] APPARATUS AND METHOD FOR REFINISHING TURBINE BLADE AIRSEALS

[75] Inventor: John P. Arrigoni, Wallingford, Conn.

[73] Assignee: United Technologies Corporation, Hartford, Conn.

[21] Appl. No.: 14,781

[22] Filed: Feb. 23, 1979

[51] Int. Cl.³ .................. B23P 15/04; B23P 6/00; B24B 21/14; B24B 21/16
[52] U.S. Cl. .................. 29/156.8 B; 29/564.2; 29/564.7; 29/402.13; 51/141; 51/217 R
[58] Field of Search .................. 29/156.8 B, 402.02, 29/402.11, 402.13, 402.16, 402.06, 402.07, 33 R, 564.2, 564.7; 51/141, 217 R

[56] References Cited

U.S. PATENT DOCUMENTS

| | | |
|---|---|---|
| 812,317 | 2/1906 | Wysong . |
| 2,431,822 | 12/1947 | Murray .................. 29/156.8 B |
| 3,685,219 | 8/1972 | Palmenberg .................. 51/141 |
| 3,885,291 | 5/1975 | DiChiara .................. 29/402.11 |
| 3,969,848 | 7/1976 | DeMusis .................. 51/141 |
| 3,984,212 | 10/1976 | DeMusis .................. 51/141 |
| 3,988,126 | 10/1976 | DeMusis .................. 51/143 |
| 4,016,683 | 4/1977 | Cretella .................. 51/143 |
| 4,028,788 | 6/1977 | DeMusis .................. 29/156.8 B |
| 4,078,337 | 3/1978 | Chiasson et al. .................. 51/141 |

FOREIGN PATENT DOCUMENTS

| | | | |
|---|---|---|---|
| 84634 | 3/1957 | Netherlands .................. | 51/141 |
| 830917 | 3/1960 | United Kingdom .................. | 51/141 |

Primary Examiner—Daniel C. Crane
Attorney, Agent, or Firm—C. G. Nessler

[57] ABSTRACT

A method and apparatus for restoring airseals on gas turbine blades and vanes. A worn or damaged airseal is removed by abrasive belt grinding perpendicular to its length to create a stub. Then a piece of material is joined to the stub, as by welding. Next the airseal weldment is contoured using abrasive belting, perpendicular to the weldment length.

The invention is particularly advantageous for the repair of components having two airseals of different dimensions. A single two-position fixture is usable to remove old airseals and to refinish airseal weldments. Refinishing is accomplished with a contoured belt; the contour is chosen to be intermediate, but within the tolerance of, the contours of the first and second airseals. As a result, airseals are economically restored in short runs.

6 Claims, 6 Drawing Figures

REPAIR PIECE ATTACHED

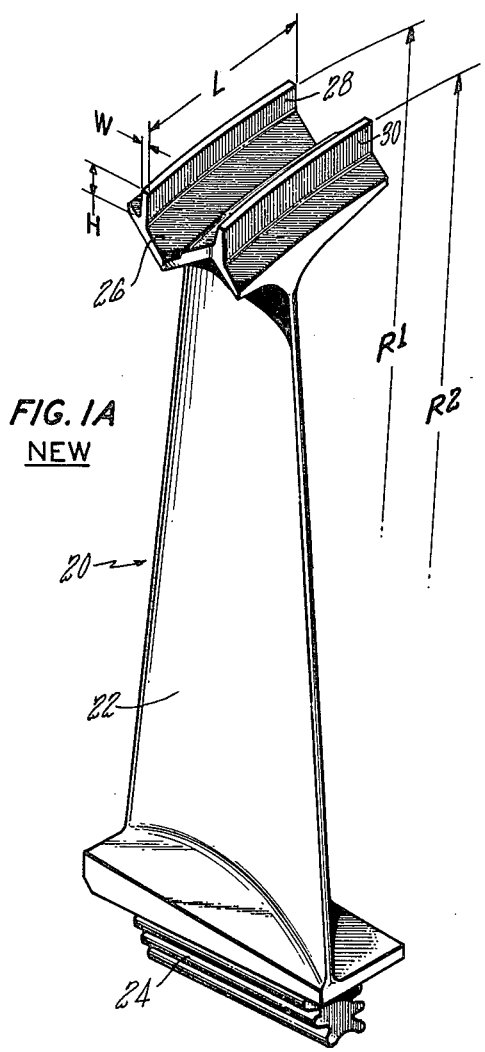
FIG. IA
NEW
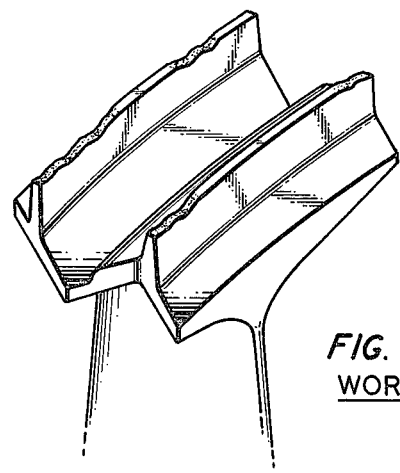
FIG. IB
WORN
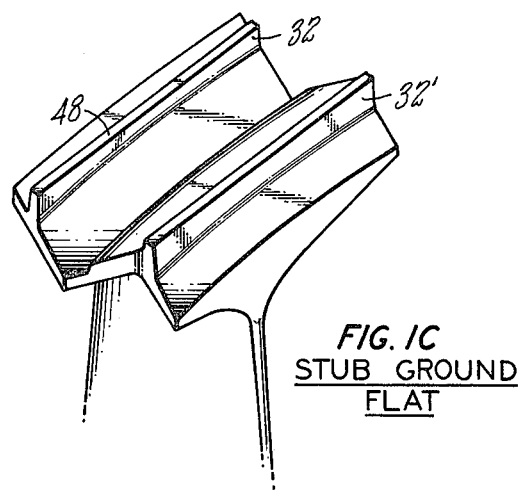
FIG. IC
STUB GROUND FLAT
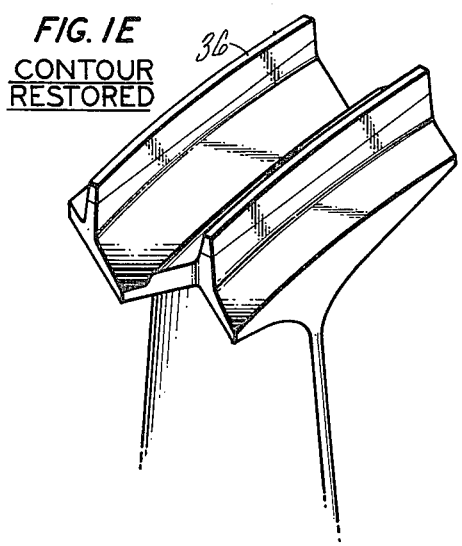
FIG. IE
CONTOUR RESTORED
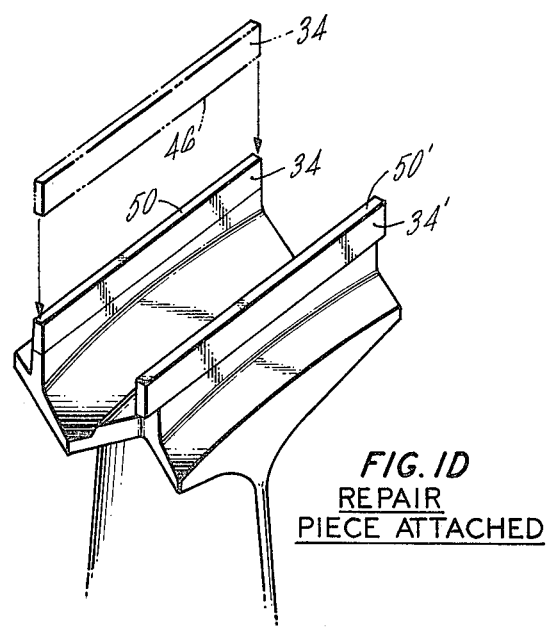
FIG. ID
REPAIR PIECE ATTACHED

APPARATUS AND METHOD FOR REFINISHING TURBINE BLADE AIRSEALS

BACKGROUND OF THE INVENTION

This invention relates to the finishing of the airseal portions of gas turbine components and more particularly to the repair and restoration of gas turbine blade and vane airseals which are worn or damaged.

Gas turbine airfoils, such as turbine blades, are adapted to channel quantities of gases at high pressure, and often high temperature. In many designs, a multiplicity of blades having tip shrouds in communication with each other are attached around the periphery of a disk which is adapted to rotate within the enclosed duct of a gas turbine. A seal is needed to prevent the passage of gases between the duct and the circumferential ring which is formed by the mating shrouds of the blades. This is conveniently accomplished by the use of circumferential fins running along the ring. The fins are created by mating segments, or airseals, on each of the individual components' shrouds. By necessity of design, airseals are relatively thin, and therefore, they are delicate. Due to normal service experience and unusual incidents, airseals will become worn or damaged. Since gas turbine airfoils are often made of cast superalloys and other advanced materials which are difficult to fabricate, their repair often represents some difficulty.

When new parts are fabricated, they are processed in relatively large quantity lot sizes. Typically, in the sequence of operations which form an airseal in a finished turbine airfoil, a quantity of airfoils will be assembled in a fixture much like the disk in which they will serve. Then the circumferential fins are machined on the assembly using a large rotary grinder. When disassembled, an airseal will be found on each part. However, such techniques are not economical for the typical service center which must repair small lot sizes of a variety of different configurations. Attempts have been made to simplify the process. Generally, the process used heretofore has comprised putting airfoils in a fixture and using a surface grinder to remove the old airseal; then a new piece of material is welded to the stub; then any surplus weldment material overhanging the ends of the old airseal stub was removed to permit use of one of the two following techniques: either the parts were assembled in a fixture suited to holding a full wheel of parts, such as is used for the original parts, or the parts were placed individually in separated fashion in a rotary fixture suited to hold a reduced number of parts; then they were placed in a rotary grinder and the circumferential surface of the airseals ground. In both instances, the airseal portions of the airfoils were mounted at a distance from a center of rotation which was comparable to that of a turbine engine. Since the diameters of modern engines are commonly more than half a meter, this required relatively large machine tools. Furthermore, setup time was rather lengthy when changing from one part number to another. Normal checking and dressing of the grinding wheel dimension was necessary to assure dimensional accuracy. Labor costs were relatively high.

A machine for avoiding some of the disadvantages of the aforementioned process is described in DeMusis, U.S. Pat. No. 3,969,848. The DeMusis machine has a shoe adapted to contour the belt in its direction of motion. The airseal length is aligned with the travel direction and the force of the airseal on the belt is what forms the belt to the shoe contour. It is evident the belt will resist this deformation and the force distribution on the airseal and the probable rate of material removal will vary. In fact, since the belt is spring-tensioned toward a flat configuration, excessive lingering of the fixtured blade at its stop position will flatten the airseal contour from that defined by the shoe. Thus, it would appear that the contour of the shoe needs to be adjusted by trial and error for a particular metal, belt, and operator, to achieve the desired dimensions.

Consequently, there is a need for an improved apparatus and method for restoring airseals which rapidly achieve the necessary contours in airseals while avoiding repetitive checking or trial and error in a setup.

As indicative of a further need, the typical turbine airfoil has two airseals. Most often one of these will have a greater radius of curvature than the other as it will be adapted to interact with a larger diameter section of the engine duct. Of course, these different radii are conveniently machined using the unattractive rotary grinder method, but there is a need for a lower cost method and apparatus for achieving acceptable contours in both airseals of a component being restored, without the obvious alternative of different setups for each seal.

SUMMARY OF THE INVENTION

An object of the invention is the economic repair and restoration of gas turbine airfoil components having worn or damaged airseals.

According to the invention, a method and apparatus are provided to: first, form a stub by grinding an old airseal using a motion perpendicular to the airseal length; then, a new piece of faying material is joined, as by welding or brazing, to the stub to form an airseal weldment; then, the weldment is ground with a motion perpendicular to its length, to a desired circumferential radius using a contoured abrasive which has substantially the contour desired in the airseal; then, any surplus airseal weldment material in regions other than at the circumferential radius contour is removed.

It is common for an airfoil component to have two airseals with two different nominal design radii of curvature. According to the preferred practice of the invention, airseal weldments on such parts, while in a single fixture, are sequentially ground to a radius intermediate the nominal design radii, the intermediate radius being within the permissible tolerances of two airseal designs. A single setup, contoured abrasive, and fixturing are thus used.

Abrasive belt grinding is the preferred means of practicing the invention. To remove worn airseals on complex parts, the belt is passed over a straight cylinder roller of suitable radius with belt angles of approach and return such that only the airseal is contacted and other important parts of the component are not touched. The direction of travel of the belt is perpendicular to the length of the airseal and a substantially flat or planar surface is produced along the length of each airseal stub, and preferably, a two-position fixture is provided to both remove the old airseals and subsequently refinish the airseals after weldments are made. For finishing in its first position, the fixture aligns the first airseal weldment perpendicular to the abrasive belt at the point at which it passes over a contouring surface, such as a roller. In its second position, the fixture aligns the second airseal weldment similarly. The contouring surface has the aforesaid intermediate radius desired in the airseals. The contour of the abrasive belt is obtained by tensioning the belt around a contoured roller. Thus, regardless of variation in the rate or time of engagement with the belt, the airseal configuration will be reproduced.

The invention is particularly suited to the repair of nickel superalloy components but is well-suited for other materials of construction as well. Also, it is applicable to the restoration of different shaped gas turbine parts, including rotatable blades and nonrotatable vanes.

Advantages of the invention include avoidance of the costly fixturing and setup characteristic of much of the prior art, thereby making repair of short runs of parts economically feasible. The method of the invention permits the use of abrasive belts, allowing higher metal removal rates than grinding wheels, without coolants. Thus, time and costs of labor are reduced. The invention also permits parts to be processed singly, eliminating certain preparatory steps previously necessary to mate parts as a group for finishing. Further, the inventive method and apparatus are sufficiently precise to allow the confident use of preset mechanical stops and avoidance of repetitive checking characteristic of some prior techniques. Since fixturing and tooling are simple, the processing of parts of new or different configurations is readily accomplished.

The foregoing and other objects, aspects, and features of the present invention will become more apparent from the following description of preferred embodiments and accompanying drawings.

BRIEF DESCRIPTION OF THE DRAWINGS

FIG. 1 is a series view of part of a turbine blade during airseal restoration.

DESCRIPTION OF THE PREFERRED EMBODIMENT

Figure 2:
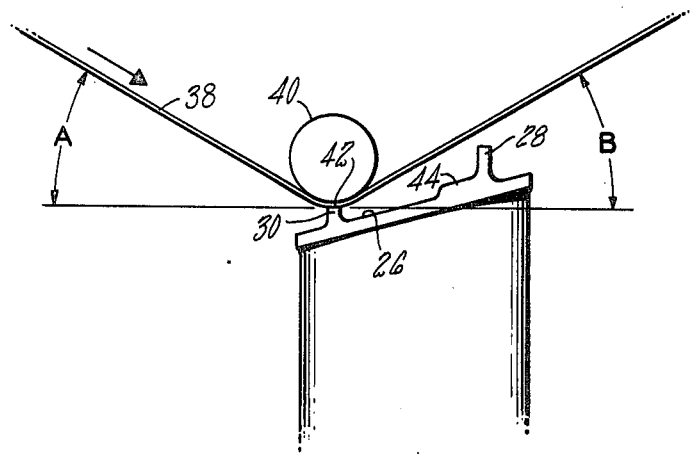
FIG. 2 is a cross-sectional partial view of an apparatus and blade during removal of an old airseal.

Airseals are thin, flange-like structures attached to the end shrouds of gas turbine airfoil components. Components having airseals include both blades, which rotate within a gas turbine machine, and vanes which are non-rotating components. The preferred embodiment herein is described in terms of repair and restoration of a blade of a nickel superalloy, although the method and apparatus of the invention are equally usable on vanes and components of other materials.

FIG. 1a illustrates a typical new gas turbine blade airfoil component having two airseals and serves to illustrate the nomenclature used herein. The blade, generally designated by the numeral 20, is comprised of an aerodynamic airfoil section 22 mounted between a root 24 and a shroud 26. Mounted on the shroud are a first airseal 28 and a second airseal 30. Each airseal is characterized by a length L a width W and a height H. As can be seen, the length L is the major dimension and the width W is relatively small compared to the other dimensions. The dimensions vary greatly with the particular design of the blade, but typical dimensions which are encountered will be a length of two centimeters, a height of three millimeters and a width of one millimeter. Thus, it can be seen that the airseals are relatively delicate structures and machining of them must be undertaken with care. Commonly, the shroud 26 is inclined with respect to the principal axis of the component 20 for aerodynamic purposes, with the result that when the component is in use the first airseal will be located at a first radial distance R1 from the axis about which the part rotates and the second airseal will be located at a different second radial distance R2. Accordingly, the design curvatures of the airseals will differ, as they will in assembly comprise flanges of differing circumferences.

FIG. 1b shows the airseal portions of the blade after typical wear and damage from service. The material and configuration of the airseals do not lend themselves to any localized repair such as adding material to the defect areas by puddle welding or a like technique. Instead, as shown in FIG. 1c, the old airseals are removed by grinding them to flat stubs 32 and 32'. The inventive apparatus and process for accomplishing this are described in more detail below. Next, new pieces of material 34 and 34', which have been separately prepared of a suitable material, are attached to the flat ground stubs, as shown in FIG. 1d. Generally, the pieces which are added have the widths desired in the airseals which are being restored, but have surplus material in the height and length dimensions. Lastly, as shown in FIG. 1e, the airseal weldments formed in the prior step are finished to the height and length of a restored airseal; this includes obtaining an acceptable circumferential radius contour at the outer end 36 of the airseal.

The following describes in more detail the apparatus and practice of the invention. In the preferred practice of the invention, abrasive belts are used, that is, continuous fabric loops with metal cutting abrasives adhered to one surface. Abrasive belts and the design, construction and operation of abrasive belt grinding machines are well known.

A blade having a damaged airseal is first inspected and cleaned of dirt and coatings as necessary. The next step is to physically remove the worn portion of the old airseals. This is accomplished using the apparatus and method illustrated by FIG. 2. An abrasive belt 38 is passed over a curved element, shown as a rotatable straight cylindrical roller 40 at a speed suitable for the belt type. The principal plane of the airseal, i.e., that defined by the height and length dimensions, is generally aligned with a plane which passes through a diameter and the axis of the roller. Thus, the belt travel and grinding action will be perpendicular to the length of the airseal and the ground surface 42 will be generally perpendicular to the height dimension of the airseal. In this manner, the airseal is contacted by the belt at a point where it lies on the roller, and the airseal is ground to a stub 32, as shown in FIG. 1c. Of course, as is evident from FIG. 2, the surface being ground 42 will have a slight curvature across its width, depending on the diameter of the roller 40. This curvature will be present in the final faying surface 48 of the stub. In practice, since the width of the airseal is rather small compared to the diameter of the roller, for the practical purpose of creating a faying surface suitable for accepting the joining of a new piece of metal, the surface is planar. This curvature, as well as any deviation from a true plane caused by slight misalignment of the principal plane of the airseal with the plane of the roller axis and diameter, is not significant for virtually all joining processes. Therefore, the ground surface is fairly characterized as being substantially planar. It can be seen from FIG. 2 that the abrasive belt has an approach angle A and departure angle B with respect to the planar surface of the ground airseal. These angles are, of course, created by the location of other rollers of the machine which support the moving abrasive belt. The approach and departure angles must be chosen so that the belt does not contact other parts of the shroud 26, such as the raised land 44, and undesirably change their dimension. Similarly, the diameter of roller 40 must be limited. The apparatus has been described in terms of the roller 40, but as is evident to those skilled in abrasive grinding art, smaller roller diameters may be associated with excess rotational speeds and resultant poor bearing life. In such instances, the roller may be replaced by a conventional curved metal platen containing a slot through which pressurized air issues to create a lubricating film. When a platen is used, its nose curvature may be non-cylindrical but will it be essentially simulative of the diameter desired in the roller it substitutes for.

After the first airseal is removed, the blade is repositioned and the second airseal is removed. To hold the blade during the aforementioned operations, a preparatory grinding fixture may be used. As noted below, this fixture is optionally the same fixture used for finish grinding, and it may be used in substantially the same apparatus as used for finishing, as will become evident from the description which follows.

A piece of metal, such as piece of strip stock shown in FIG. 1d, is next prepared. The size of this piece must be adequate for finishing into a properly contoured airseal when it is attached to the airseal stub. The piece of material is prepared with a substantially planar surface 46 on one face, the planar surface having a length at least equal to that of the airseal stub to which it is to be joined to provide a faying surface for joining. Often, the piece is excessive in length, as shown by piece 34', to ease the problems of location and of obtaining an adequate weld joint at the ends of the faying surfaces; and an excessive height of the piece of material provides machining allowance for the desired circumferential contour of the outer surface 50, i.e., the surface opposite the faying surface. In addition, surplus height is desirable to accommodate dimensional variables associated with the joining process, as well as any variability in the location of the ground planar surface of the stub. A variety of techniques can be used to join the pieces 34, 34' to the stubs 32, 32' to form an airseal weldment. Probably most preferred is electron beam welding; tungsten inert gas welding is also acceptable. In both cases, the piece and airseal are appropriately fixtured and placed in a welding machine using well-known techniques. Brazing and other well-known techniques adaptable to the particular material of a specific airfoil also may be used.

The airseal weldment created by joining the piece to the stub has a free surface 50 opposite the surface of the piece which fayed with the airseal stub surface. The height of the surface 50 above the shroud, that is the height of the airseal weldment, will be in excess of that which is desired in the finished airseal. It is an object of the next described contour grinding step to machine the surface 50 to a dimension which will conform to the contour required in an airseal and which will conform with the design height of the original component.

Figure 3:
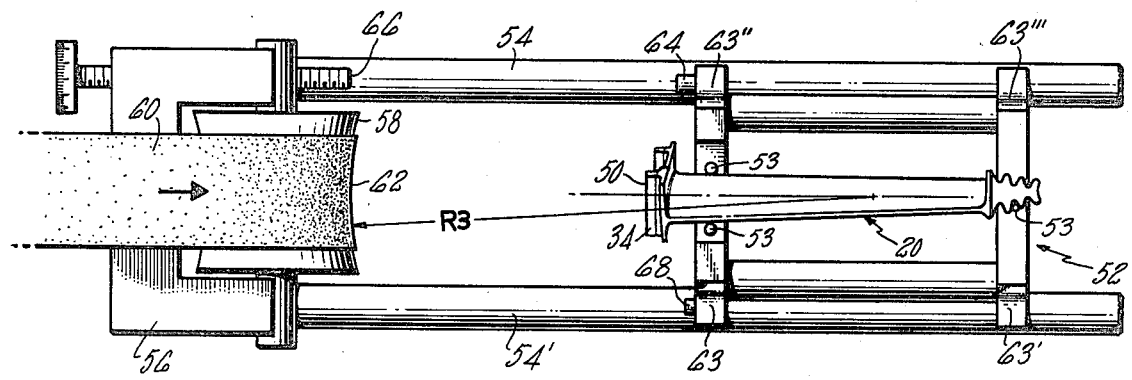
FIG. 3 is a top view of an apparatus showing a two-airseal turbine blade in a fixture for grinding of a first airseal weldment.

After welding, the blade 20 having the airseal weldments on its shroud end is clamped in a fixture 52, where pins 53 or other locating means accurately position the blade, as shown in FIG. 3. The blade is held in the fixture by a quick release toggle clamp, pins, bolts, or other mechanical means (not shown) which will be evident to those familiar with common fixturing and tooling. The fixture is capable of being mounted in two positions on rails 54 and 54'; in FIG. 3 and FIG. 4 the fixture is shown in its first position. The rails 54 and 54' are affixed to a machine structure 56 which is also adapted to hold a rotatable and contoured roller, or contact wheel 58, across which a flexible abrasive belt 60 is moved. The contact wheel has a predetermined contour 62 with which the abrasive belt, by virtue of the normal tension in the belt and its inherent flexibility, is made to conform. The abrasive belt is of a width greater than the length of an airseal weldment and is comprised of a material suitable to readily grind the airseal weldment material. To insure that the belt fully conforms to the contour of the contact wheel, it is preferable that the belt have a particularly flexible fabric backing; commercial belts of the "J" have been found most suitable. For grinding nickel superalloys, belts having alumina abrasive of 120 US mesh grit size are preferred. Belt speed is not critical to the invention and may be based on the belt supplier's recommendation.

Figure 4:
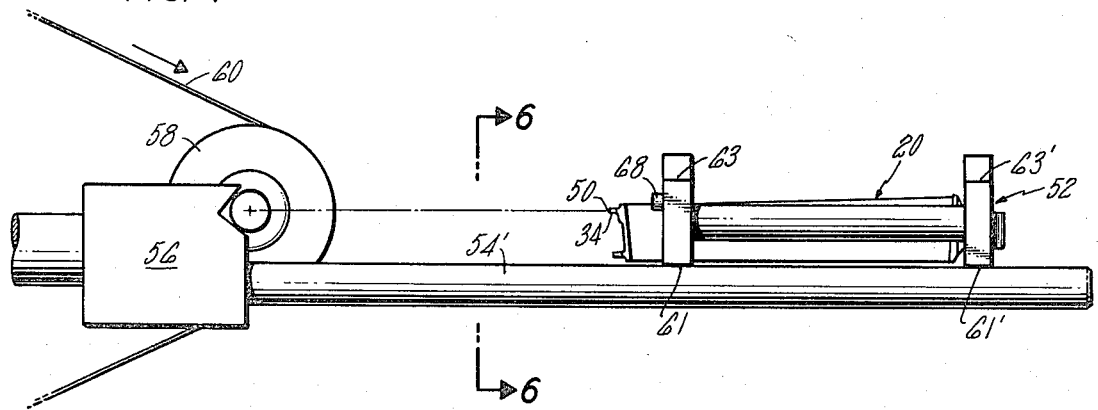
FIG. 4 is a side view of the apparatus and blade in FIG. 3.
Figure 6:
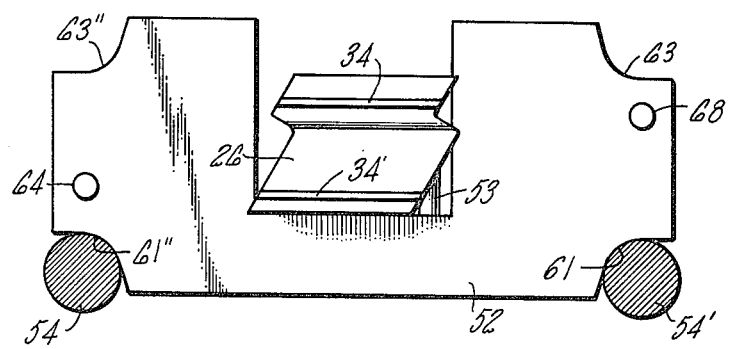
FIG. 6 is a sectional end view of the apparatus and fixture of FIG. 4.

The blade is accurately positioned in the fixture 52; the fixture is mounted on the rails, contacting them with its mating integral precision surfaces 61, 61', 61'', 61''', as indicated in FIGS. 4 and 6. Thus, the blade is accurately positioned in the apparatus and the airseal weldment is perpendicular to the direction of belt travel, as shown in FIGS. 3 and 4. Further, as shown in FIG. 4, the airseal is also positioned in space so that as it approaches the contact wheel, its mean height dimension will be generally aligned along a diameter of the contact wheel. The contour 62 of the contact wheel is selected to be a radius R3 which corresponds with that desired as the circumferential radius contour of the airseal being ground. The fixture is then moved along the rails so that the airseal weldment surface 50 contacts the abrasive belt. Upon doing this, the airseal is rapidly ground to the desired contour. Motion of the fixture toward the roller is continued until a first position stop 64 contacts a preset adjustable stop pad 66 mounted on the machine structure supporting the contact wheel and rails. Thereby, the desired height, as well as the desired circumferential contour, of the airseal will be achieved.

Figure 5:
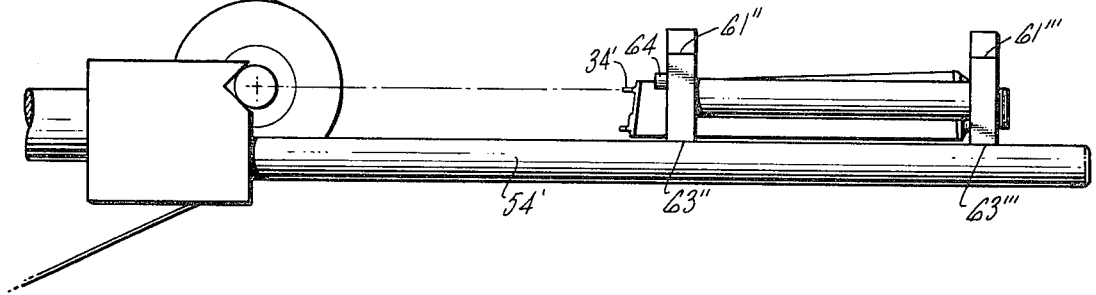
FIG. 5 is a partial side view of the apparatus in FIG. 3 showing the fixture and blade in position for grinding a second airseal weldment.

Having accomplished finishing of the first airseal, the fixture is moved away from the contact wheel, lifted from the rails, rotated 180° about the axis of the blade which is still clamped in the fixture, and replaced on the rails in its second position. thus, as shown in FIG. 5, the fixture by virtue of its integral precision surfaces 63, 63', 63'', 63''' in contact with the rails, will spatially position the second airseal weldment with respect to the contact wheel in a manner analagous to that described for the first airseal weldment and fixture in the first position. The second airseal weldment is also analagously finished with the aid of the second integral fixture stop 68 which interacts with stop pad 66 in its unchanged position. As can be seen by examining the Figures, the diameter of the contact wheel and the entrance and departure angles of the belt with respect to the blade must be chosen so that, when one airseal weldment is ground, the other airseal or the shroud are not contacted to their detriment. Since the finished surfaces of the airseals are substantially higher off the shroud than the stub surfaces, there is less criticality here compared to the airseal removal operation.

Of course, if a different contour is desired in the second airseal weldment from that obtained in the first airseal weldment, then the contact wheel will have to be changed when the fixture is moved to its second position. Different contours could be achieved by sequentially grinding a series of first airseal weldments by inserting components one after another in the fixture while it is in its first position. Then, the fixture would be moved to its second position and the blades would be reinserted sequentially in the fixture. Instead of this undesirable option, it wil be found that a careful selection of the contour 62 of the contact wheel, abetted by the high precision achievable with the apparatus and method described herein, will permit using the same contact wheel and contour for both the first and second airseals on most turbine airfoils. This is accomplished by having the contour 62 of the contact wheel be that described by a radius R3 which is intermediate between the nominal design radius R1 of the first airseal and the nominal design radius R2 of the second airseal. This is only feasible when the design tolerances of the circumferential contours of the airseals permit.

As was mentioned previously, the piece of material which is added to the airseal stub to form the airseal weldment may often have a length in excess of that desired in the finished airseal. The invention is advantageous in allowing the finished contour to be formed on the airseal weldment without prior removal of the overhanging length. This is contrasted with prior techniques, where the fixture requirements and mechanical forces in grinding are such that this would have to be removed before contouring. After the contour is applied to the airseals by the preferred embodiment procedures, the overhanging length which remains is removed by a separate abrasive grinding operation, and any other surplus material on the airseal, such as along the sides or in the weld zones is also removed. Experience in practicing the invention on a number of parts indicates relatively little work is required after contour grinding, other than the trimming to length previously mentioned.

The foregoing sequence of operations was described in terms of a preparatory fixture for holding the blade when old airseals are removed and flat ground stubs created, and a second fixture usable for finish contouring of the airseal weldments. In practice, it is found that the same fixture and rails may be used for both operations, the fixture being substantially that described in detail for the finishing operations. Suitable adjustment of the stop pad 66 would be made to achieve the appropriate limit position between the fixture and the straight cylindrical roller used for old airseal removal. Further, while the preferred embodiment entails the use of abrasive belts, it is evident that for specialized purposes other abrasive forms might be used. For example, grinding wheels of the appropriate contour and diameter may be substituted, although the present commercially available wheels will be far inferior in performing the invention than abrasive belts. And while the component has been described in terms of a first airseal having a larger circumferential radius than a second airseal, and the sequence of operations has been described in terms of the first airseal being machined before the second airseal, it should be evident that the relative radii could be reversed, as could the sequence of operations, whether the radii are the same or reversed relationship.

Although this invention has been shown and described with respect to a preferred embodiment, it will be understood by those skilled in the art that various changes in form and detail thereof may be made without departing from the spirit and scope of the claimed invention.

Having thus described the best mode and preferred embodiment of my invention, that which I claim is:

1. The method of repairing and restoring a gas turbine airfoil component having a circumferential airseal at its top shroud, comprising:
    (a) grinding the airseal portion of the component to produce an airseal stub having a substantially planar surface;
    (b) providing a piece of metal having a surface which is capable of faying with the airseal stub surface and the length of which is at least equal to the length L of the surface of the airseal stub;
    (c) aligning the surfaces of the piece and the airseal stub so they fay with their lengths aligned;
    (d) metallurgically joining the piece to the airseal stub to create an airseal weldment having a length L;
    (e) providing a grinding surface having a fixed contour, the contour being substantially that circumferential radius contour required on the airseal of a restored airfoil;
    (f) grinding the airseal weldment at the free outer surface opposite the joined faying surface by moving the component toward the contoured grinding surface so the grinding motion at the point of contact with the said free outer surface is substantially perpendicular to the airseal weldment length L;
    (g) positively producing the desired airseal contour and height H irrespective of time or rate of engagement with the grinding surface by moving the airfoil toward the grinding surface to a stop position; and
    (h) removing any other surplus airseal weldment material by grinding and polishing to finish the airseal restoration.

2. The method of repairing a gas turbine airfoil component having a first circumferential airseal designed to a first nominal radius R1, and a second circumferential airseal designed to a second nominal radius R2, comprising:
    (a) grinding the airseals with an abrasive belt to produce first and second airseal stubs having substantially planar surfaces;
    (b) providing a first piece of metal and a second piece of metal, each piece having a surface the length of which is at least equal to the length of the first and second airseal stub surfaces, respectively;
    (c) faying the respective pieces and stubs at their said surfaces so their lengths align;
    (d) metallurgically joining the pieces and stubs to form airseal weldments;
    (e) providing a movable abrasive belt on a contact wheel having a fixed surface contour capable of grinding a circumferential radius contour intermediate the first seal nominal design radius R1 and the second seal nominal design radius R2;

(f) fixedly holding the component in a fixture and sequentially placing the fixture in a first position and then in a second position, each position disposing a separate airseal for grinding so the length L thereof is aligned with the centerline of the contact wheel and the height H thereof lies within a plane taken through a diameter of the contact wheel, thereby causing the airseals to be ground in sequence by the abrasive belt; such that the grinding motion of the belt at the point of contact with the airseal weldments is substantially perpendicular to the airseal lengths.

(g) moving the fixture toward the belt to predetermined stop positions with respect to the belt, sequentially in the first and second positions, so that the airseal weldments are ground by the belt on the contact wheel to a radius R3 intermediate the first and second nominal design radii irrespective of the time or rate of engagement of the airseals with the abrasive belt;

(h) removing surplus material at locations apart from the circumferential radius to finish the replacement of the airseal portions of the component.

3. The method of claim 2 further comprising the fixture and procedure of step (f) in the operation of step (a).

4. The methods of claim 2 or 3 wherein the second position of the fixture is obtained by rotating the fixture 180° about the longitudinal axis of the component held therein.

5. Apparatus for grinding the finished circumferential contour of a first airseal and a second airseal of a gas turbine airfoil component, the airseals having different design radii, comprising:

(a) a movable abrasive belt having, in a plane perpendicular to the belt travel direction, a contact surface contour formed on a contact roller, for grinding airseals;

(b) means for supporting a grinding fixture, mounted in proximity to the abrasive belt;

(c) a grinding fixture movably mounted on the supporting means, the fixture adapted to hold a component in a manner which enables grinding of the airseals by the moving abrasive belt on the contact roller, the fixture having two positions with respect to the said contact roller, a first position such that the location of the length of a first airseal of the component holdable in the fixture is parallel with the centerline of the roller and the location of the first airseal height lies within a plane taken through a diameter of the roller, and a sequential second position wherein the location of the second airseal of the component is disposed similarly to that described for the first, so that the grinding motion of the belt at the point of contact with the airseals is substantially perpendicular to the airseal lengths; and (d) means for guiding the grinding fixture toward the abrasive belt to predetermined stop positions, to remove surplus material and form the airseals to a finish contour.

6. The apparatus of claim 5 wherein the second position of the fixture is 180° of rotation from the first position, as rotation is measured about the longitudinal axis of the component fixedly holdable therein.

* * * * *

UNITED STATES PATENT AND TRADEMARK OFFICE
CERTIFICATE OF CORRECTION

PATENT NO. : 4,285,108
DATED : August 25, 1981
INVENTOR(S) : John P. Arrigoni

It is certified that error appears in the above—identified patent and that said Letters Patent is hereby corrected as shown below:

Column 8, line 16 "top" should be --tip--.

Column 9, line 13 "." should be ";".

Column 9, line 25, after "comprising" insert --using--.

Signed and Sealed this

Second Day of March 1982

[SEAL]

Attest:

GERALD J. MOSSINGHOFF

Attesting Officer

Commissioner of Patents and Trademarks